(12) United States Patent
Bodiya et al.

(10) Patent No.: US 12,510,754 B2
(45) Date of Patent: Dec. 30, 2025

(54) WAVEGUIDE WITH REGIONAL ANTI-REFLECTION COATING

(71) Applicant: GOOGLE LLC, Mountain View, CA (US)

(72) Inventors: Timothy Paul Bodiya, Toronto (CA); Shreyas Potnis, Kitchener (CA); Syed Moez Haque, Vaughan (CA)

(73) Assignee: GOOGLE LLC, Mountain View, CA (US)

( * ) Notice: Subject to any disclaimer, the term of this patent is extended or adjusted under 35 U.S.C. 154(b) by 314 days.

(21) Appl. No.: 17/481,671

(22) Filed: Sep. 22, 2021

(65) Prior Publication Data

US 2022/0299711 A1   Sep. 22, 2022

Related U.S. Application Data

(60) Provisional application No. 63/081,703, filed on Sep. 22, 2020.

(51) Int. Cl.
| | |
|---|---|
| *G02B 27/01* | (2006.01) |
| *F21V 8/00* | (2006.01) |
| *G02B 6/34* | (2006.01) |
| *G02B 6/42* | (2006.01) |

(52) U.S. Cl.
CPC ....... *G02B 27/0172* (2013.01); *G02B 6/0016* (2013.01); *G02B 6/34* (2013.01); *G02B 6/4207* (2013.01); *G02B 2027/0178* (2013.01)

(58) Field of Classification Search
CPC . G06F 3/011–016; G02B 6/34; G02B 6/4207; G02B 27/0172; G02B 2027/0178
See application file for complete search history.

(56) References Cited

U.S. PATENT DOCUMENTS

| | | | |
|---|---|---|---|
| 2015/0154988 A1* | 6/2015 | Takei | G11B 5/4866 369/13.14 |
| 2018/0118606 A1* | 5/2018 | Lambricht | C03C 4/10 |
| 2019/0179057 A1* | 6/2019 | Peroz | G02B 1/115 |
| 2020/0166691 A1* | 5/2020 | Vartiainen | G02B 27/4272 |
| 2020/0226977 A1* | 7/2020 | Blank | G09G 3/346 |

* cited by examiner

*Primary Examiner* — Hang Lin

(57) ABSTRACT

Improving the performance and efficiency of waveguide gratings while also improving the anti-reflection performance of the waveguide can be achieved by selective application of a dielectric anti-reflective coating (or coatings) to distinct regions of the waveguide. For example, a multi-layer dielectric anti-reflective coating is selectively applied to the region of the waveguide between an exit pupil expander grating and an outcoupler grating wherein light is transmitted within the waveguide via instances of total internal reflection (TIR) and where no gratings are typically present. By selectively excluding the regions of the waveguide containing gratings from receiving the anti-reflective coating, such as the incoupler and outcoupler regions, the performance of the gratings can be improved for their respective functions without compromising the anti-reflection performance of the waveguide overall.

19 Claims, 4 Drawing Sheets

WAVEGUIDE WITH REGIONAL ANTI-REFLECTION COATING

CROSS-REFERENCE TO RELATED APPLICATIONS

The present application claims priority to U.S. Provisional Patent Application Ser. No. 63/081,703, entitled "WAVEGUIDES WITH IMPROVED ANTIREFLECTIVE AND/OR COLOR RESPONSE PROPERTIES" and filed on Sep. 22, 2020, the entirety of which is incorporated by reference herein.

BACKGROUND

In the field of optics, a combiner is an optical apparatus that combines two light sources, for example, environmental light from outside of the combiner and light transmitted from a micro-display that is directed to the combiner via a waveguide. Optical combiners are used in wearable heads up displays (WHUDs), sometimes referred to as head-mounted displays (HMDs) or near-eye displays, which allow a user to view computer-generated content (e.g., text, images, or video content) superimposed over a user's environment viewed through the HMD, creating what is known as augmented reality (AR) or mixed reality (MR).

Transmitting the light from a micro-display to a user's eye in an HMD generally involves multiple reflections, refractions, diffractions, and/or changes in polarization that can cause stray light within the system. Stray light in an HMD reduces image contrast and can create haziness and ghost images in the field of vision. Thus, minimizing stray light in HMDs provides a user with a more enjoyable viewing experience while also reducing eye fatigue.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

Figure 1:
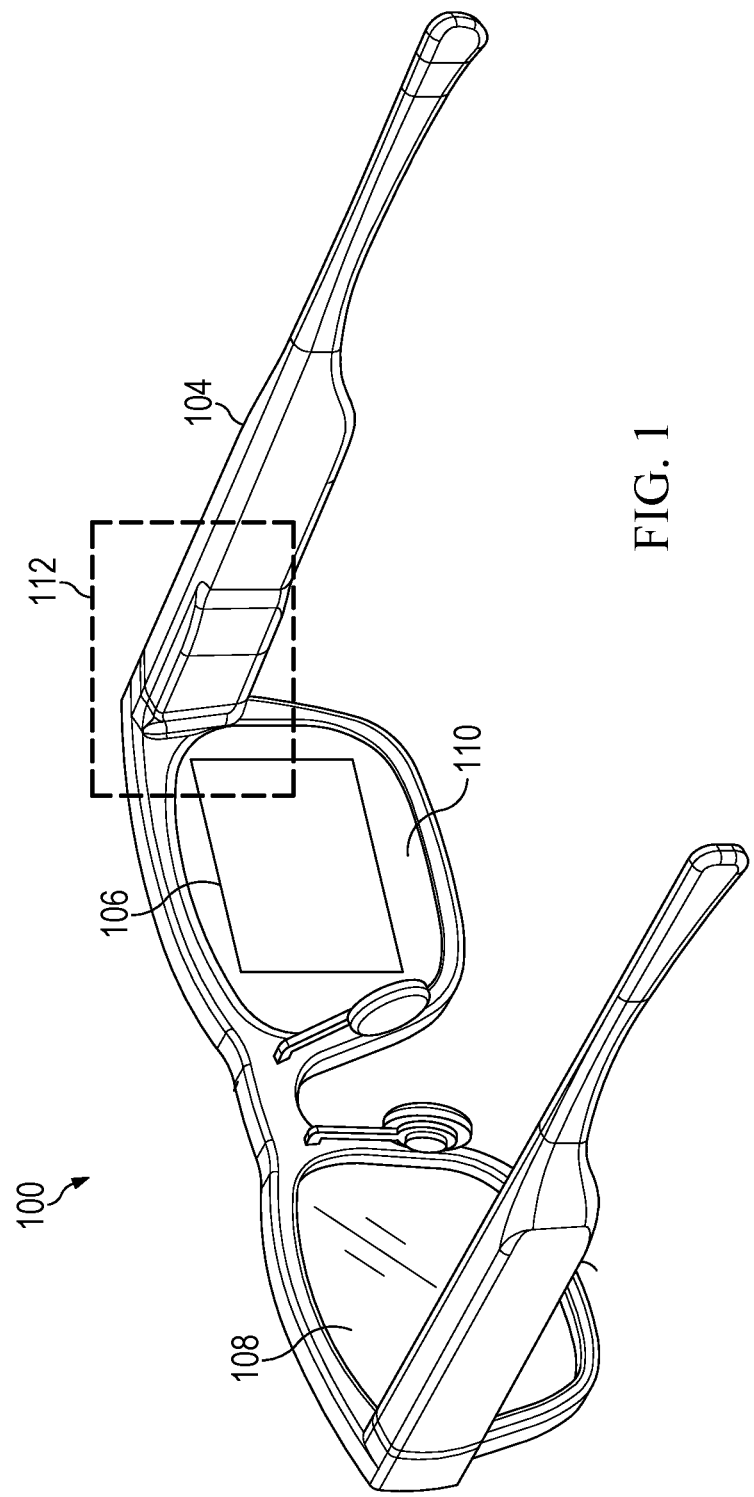
FIG. 1 is an example head-mounted display (HMD) system in accordance with some embodiments.

Anti-reflective coatings are typically applied to HMDs to eliminate ghost images and haziness caused by stray light in the system, to maximize light transmission to improve clarity of vision, and to reduce the negative distracting effects of multiple reflections from optical surfaces. Anti-reflective coatings are generally formed by one or more thin layers of stacked dielectric material, with specifically chosen thickness(es) such that interference effects within the coating stack result in destructive interference towards zero net reflected energy.

However, these anti-reflective coatings can worsen the function of other components of the HMD, such as, for example, optical gratings with identically targeted coating thicknesses used within the system to direct light into or out of the waveguide and to increase the size of a display exit pupil (i.e., increase the eyebox region where a user can view the image). For such an example, the performance tradeoff between anti-reflection and grating diffraction may require a compromise against both functions otherwise optimized individually. An example of this would be the anti-reflection coatings reducing the index contrast of the diffractive gratings, and thus reducing the efficiency, or modifying the spectral properties of the gratings. Thus, the anti-reflective performance of an HMD may be compromised in order to provide better display metrics, such as the efficiency of the HMD and uniformity of the images projected therefrom.

Improving the performance and efficiency of waveguide gratings while also improving the anti-reflection performance of the waveguide can be achieved by selective application of a dielectric anti-reflective coating (or coatings) to distinct regions of the waveguide. For example, a multi-layer dielectric anti-reflective coating can be selectively applied to the region of the waveguide between an exit pupil expander grating and an outcoupler grating wherein light is transmitted within the waveguide via instances of total internal reflection (TIR) and where no gratings are typically present. By selectively excluding the regions of the waveguide containing gratings from receiving the anti-reflective coating, such as the incoupler and outcoupler regions, the performance of the gratings can be improved for their respective functions without compromising the anti-reflection performance of the waveguide overall. Similarly, each region of the waveguide containing a grating can be divided into segments and each segment coated with an anti-reflective coating or excluded from coating based on the properties and desired performance for the respective segment of the grating.

It should be noted that, although some embodiments of the present disclosure are described and illustrated with reference to a particular example near-eye display system in the form of an HMD, it will be appreciated that the apparatuses and techniques of the present disclosure are not limited to this particular example, but instead may be implemented in any of a variety of display systems using the guidelines provided herein.

FIG. 1 illustrates an example head-mounted display (HMD) system 100 in accordance with some embodiments having support structure 102 that includes an arm 104, which houses a micro-display projection system configured to project images toward the eye of a user, such that the user perceives the projected images as being displayed in a field of view (FOV) area 106 of a display at one or both of lens elements 108, 110. In the depicted embodiment, the display system 100 includes a support structure 102, which is configured to be worn on the head of a user and has a general shape and appearance (i.e., "form factor") of an eyeglasses frame. The support structure 102 contains or otherwise includes various components to facilitate the projection of such images toward the eye of the user, such as a projector and a waveguide (shown in FIGS. 2 and 3). In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments, the support structure 102 includes one or more batteries or other portable power sources for supplying power to the electrical components of the HMD 100. In some embodiments, some or all of these components of the HMD 100 are fully or partially contained within an inner volume of support structure 102, such as within the arm 104 in region 112 of the support structure 102. It should be noted that while an example form factor is depicted, it will be appreciated that in other embodiments the HMD 100 may have a different shape and appearance from the eyeglasses frame depicted in FIG. 1.

One or both of the lens elements 108, 110 are used by the HMD 100 to provide an augmented reality (AR) or mixed reality (MR) display in which rendered graphical content can be superimposed over or otherwise provided in conjunction with a real-world view as perceived by the user through the lens elements 108, 110. For example, light used to form a perceptible image or series of images may be projected by the micro-display of the HMD 100 onto the eye of the user via a series of optical elements, such as a waveguide formed at least partially in the corresponding lens element and one or more prisms. One or both of the lens elements 108, 110 thus include at least a portion of a waveguide that routes display light received by an incoupler of the waveguide to an outcoupler of the waveguide, which outputs the display light toward an eye of a user of the HMD 100. The display light is modulated and projected onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more light-emitting diodes (LEDs) or organic light-emitting diodes (OLEDs). In some embodiments, the projector includes multiple laser diodes (e.g., a red laser diode, a green laser diode, and a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector projects light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

Figure 2:
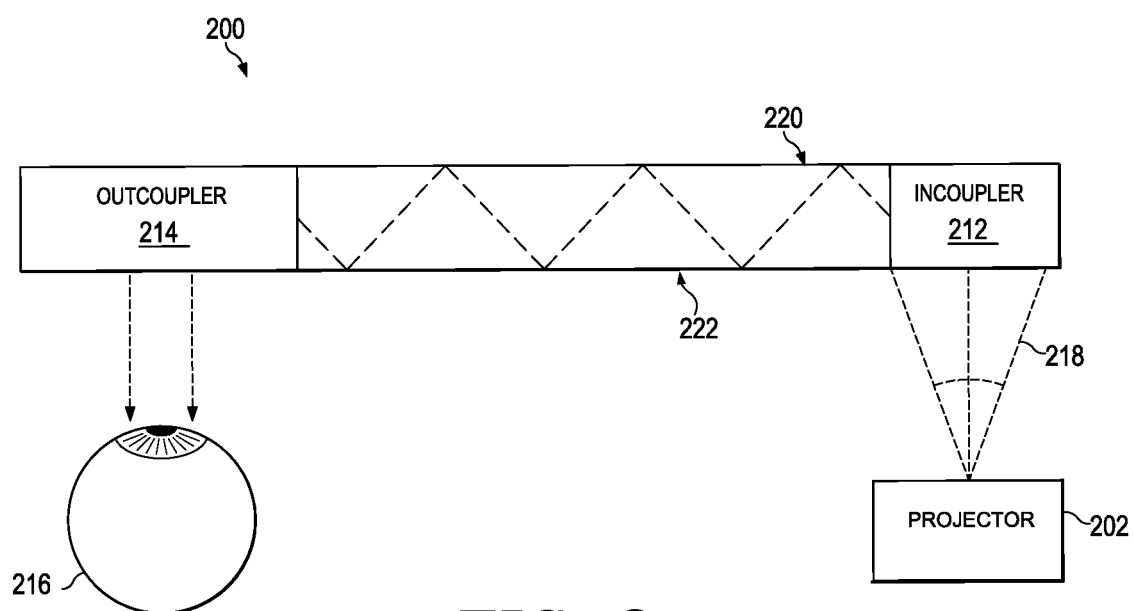
FIG. 2 is a block diagram of a projection system of an HMD, such as the HMD of FIG. 1, that projects images directly onto the eye of a user via a waveguide in accordance with some embodiments.

FIG. 2 illustrates a block diagram of a projection system 200 that projects images directly onto the eye of a user via a waveguide 205. The projection system 200 includes a projector 202 and a waveguide 205 having an incoupler 212 and outcoupler 214, with the outcoupler 214 being optically aligned with an eye 216 of a user in the present example. In some embodiments, the projection system 200 is implemented in a wearable heads-up display or other display system, such as the HMD system 100 of FIG. 1.

The projector 202 includes one or more light sources configured to generate and output light 218 (e.g., visible light such as red, blue, and green light and, in some embodiments, non-visible light such as infrared light). In some embodiments, the projector 202 is coupled to a driver or other controller (not shown), which controls the timing of emission of light from the light sources of the projector 202 in accordance with instructions received by the controller or driver from a computer processor coupled thereto to modulate the light 218 to be perceived as images when output to the retina of an eye 216 of a user.

For example, during operation of the projection system 200, light beams are output by the light sources of the projector 202, then directed into the waveguide 205, before being directed to the eye 216 of the user. In embodiments where the projection system 200 employs a laser scanning projector, the projector 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

The waveguide 205 of the projection system 200 includes the incoupler 212 and the outcoupler 214. The term "waveguide," as used herein, will be understood to mean a combiner using one or more of total internal reflection (TIR), specialized filters, or reflective surfaces, to transfer light from an incoupler (such as the incoupler 212) to an outcoupler (such as the outcoupler 214). The waveguide further includes two major surfaces 220 and 222, with major surface 220 being world-facing (i.e., the surface farthest from the user) and major surface 222 being eye-facing (i.e., the surface closest to the user). In some embodiments, incoupler 212 and outcoupler 214 are located, at least partially, at major surface 220. In another embodiment, incoupler 212 and outcoupler 214 are located, at least partially, at major surface 222. In further embodiments, incoupler 212 is located at one of the major surfaces, while outcoupler 214 is located at the other of the major surfaces.

In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the light 218 received at the incoupler 212 is relayed to the outcoupler 214 via the waveguide 205 using TIR. The light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing projection system 200.

Although not shown in the example of FIG. 2, in some embodiments additional optical components are included in any of the optical paths between the projector 202 and the incoupler 212, between the incoupler 212 and the outcoupler 214, or between the outcoupler 214 and the eye 216 (e.g., in order to shape the light for viewing by the eye 216 of the user). In some embodiments, a prism (not shown) is used to steer light from the projector 202 into the incoupler 212 so that light is coupled into incoupler 212 at the appropriate angle to encourage propagation of the light in waveguide 205 by TIR. Also, in some embodiments, an exit pupil expander (e.g., exit pupil expander 312 of FIG. 3, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the light out of waveguide 205.

Figure 3:
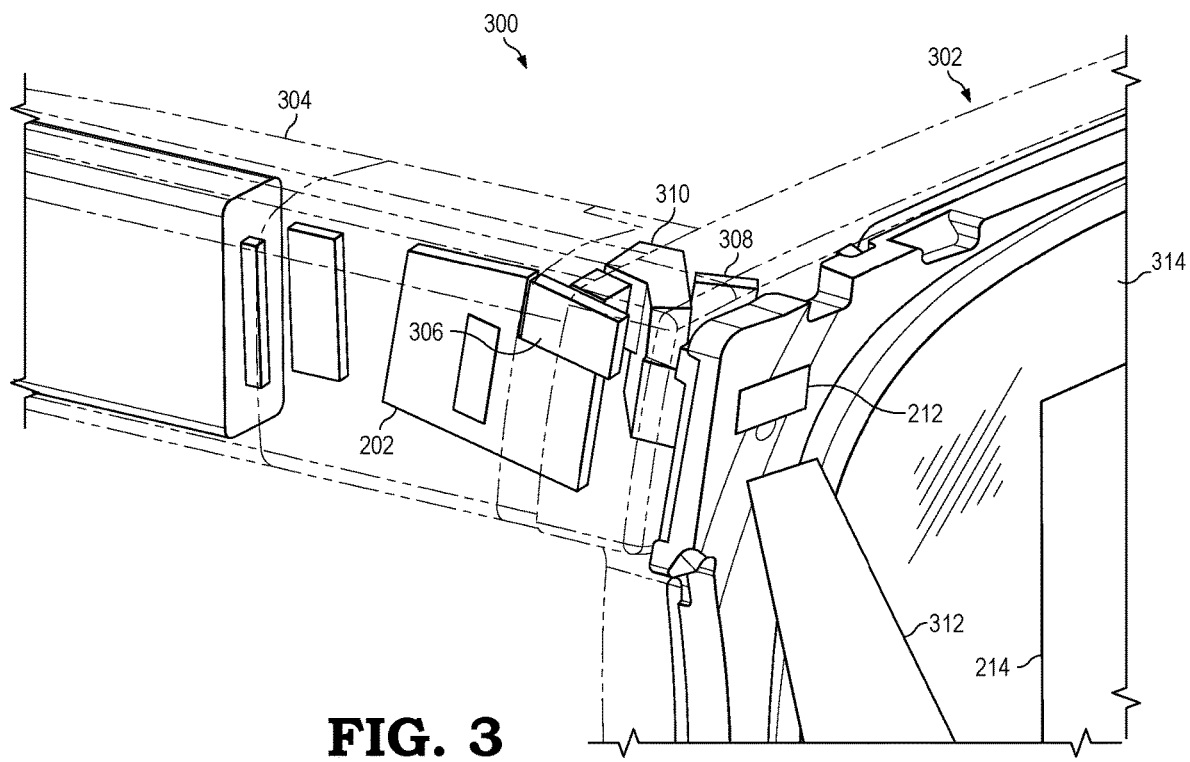
FIG. 3 is a perspective, partially transparent view of a portion of the HMD of FIG. 1 in accordance with some embodiments.

FIG. 3 shows a perspective, partially transparent view 300 of a portion of an HMD 302, which represents the display system 100 of FIG. 1. The HMD 302 includes an example arrangement of the projection system 200 of FIG. 2, for an embodiment in which the projector 202 is a scanning laser projector. In some embodiments, the HMD 302 corresponds to the display system 100 of FIG. 1, and the illustrated portion of the HMD 302 corresponds to the region 112 of the display system 100. In other embodiments, the projector 202 is an LED or OLED display that transmits light 218 to a field lens (not shown), which routes the light 218 into the waveguide 205 via the incoupler 212. Independent of the type of projector and means by which light 218 is directed to the incoupler 212 of the waveguide 205, the light 218 is transmitted within and outcoupled from the waveguide 205 in a similar manner.

As shown by FIG. 3, arm 304 of the HMD 302 houses the projector 202. The incoupler 212 and the outcoupler 214 of the waveguide 205 (not fully shown in the view of FIG. 4), are each embedded in or otherwise disposed on the lens 314 (one embodiment of, for example, lens 110 of FIG. 1). As described previously, light output by the projector 202 (e.g., light 218, FIG. 2) is routed to the incoupler 212 via various optical components, for example, a first scan mirror 306, optical relay 310, and a second scan mirror 308. The first scan mirror 306 oscillates or otherwise rotates to scan the laser light along a first scanning axis, and the second scan mirror 308 oscillates or otherwise rotates to scan the laser light along a second scanning axis that is perpendicular to the first scanning axis. Laser light reflected by the second scan mirror 308 converges to a line at the incoupler 212. Relayed light received at the incoupler 212 is routed to the exit pupil expander 312 and then to the outcoupler 214 via the waveguide 205. The laser light received at the outcoupler 214 is then directed out of the waveguide 205 (e.g., toward the eye of a user of the HMD 302).

Figure 4:
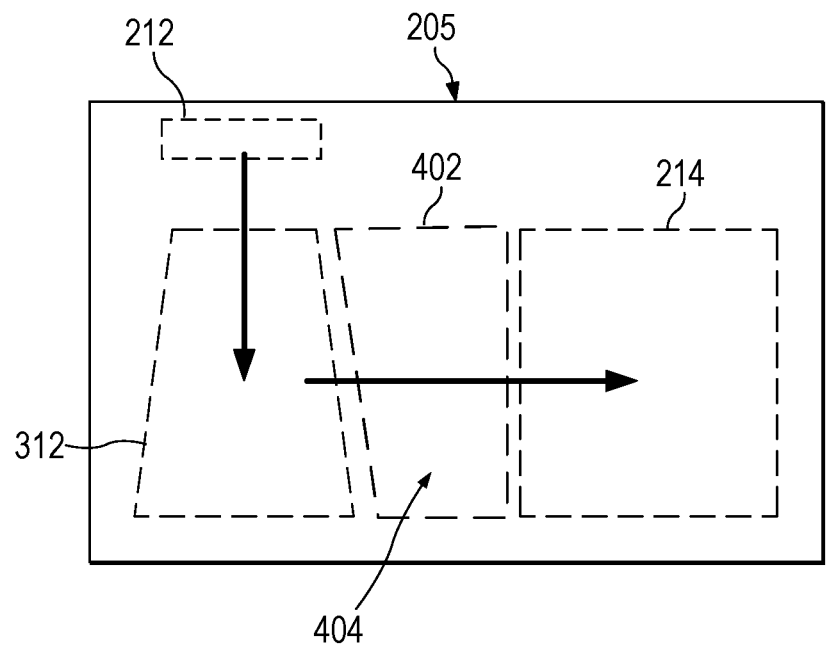
FIG. 4 shows an example of light propagation within the waveguide of the projection system of FIG. 2 in accordance with some embodiments.

FIG. 4 shows an example of light propagation within the waveguide 205 of the projection system 200 of FIG. 2. As shown, light received via the incoupler 212 is directed into an exit pupil expander 312 and is then routed to the outcoupler 214 to be output (e.g., toward the eye of the user). In some embodiments, the exit pupil expander 312 expands one or more dimensions of the eyebox of an HMD that includes the projection system 200 (e.g., with respect to what the dimensions of the eyebox of the HMD would be without the exit pupil expander 312). In some embodiments, the incoupler 212 and the exit pupil expander 312 each include respective one-dimensional diffraction gratings (i.e., diffraction gratings that extend along one dimension), which diffract incident light in a particular direction depending on the angle of incidence of the incident light and the structural aspects of the diffraction gratings.

It should be understood that FIG. 4 shows a substantially ideal case in which the incoupler 212 directs light straight down (with respect to the presently illustrated view) in a first direction, and the exit pupil expander 312 directs light to the right (with respect to the presently illustrated view) in a second direction that is perpendicular to the first direction. While not shown in the present example, in some embodiments, the first direction in which the incoupler 212 directs light is slightly or substantially diagonal (that is, at an angle with respect to a surface of the exit pupil expander 312 through which the light enters the exit pupil expander 312).

Also shown in FIG. 4 is an intermediate region 402 of the waveguide 205 through which light from the exit pupil expander 312 travels to the outcoupler 214. Region 402 is where light is transmitted within the waveguide 205 via TIR and is free from any type of optical grating which may interfere with TIR. Thus, the incoupler 212, the exit pupil expander 312, and the outcoupler 214 are regions of the waveguide containing gratings, while region 406 is grating-free.

As discussed above, anti-reflective coatings can interfere with the functioning of optical gratings within an HMD. Thus, in order to optimize the performance and efficiency of the gratings of waveguide 205, such as incoupler 212, exit pupil expander 312, and outcoupler 214, while also optimizing the anti-reflection performance of the waveguide, anti-reflective coating(s) is/are applied to only select regions of waveguide 205. For example, as shown in FIG. 3, only region 402 is overlayed with anti-reflective coating 404, while no anti-reflective coating is overlayed on any of incoupler 212, exit pupil expander 312, or outcoupler 214. Accordingly, each of incoupler 212, exit pupil expander 312, or outcoupler 214 are optimized for their respective functions within the waveguide 205, such as incoupling light, expanding the exit pupil, and outcoupling light, respectively, while region 402 is optimized for anti-reflective performance. In some embodiments, anti-reflective coating 404 is a multi-layer dielectric coating made of alternating layers of low refractive index dielectric material and high refractive index dielectric material. In some embodiments, anti-reflective coating 404 is comprised of alternating layers of Silicon dioxide ($SiO_2$) and Titanium dioxide ($TiO_2$) of varying thicknesses. Other dielectric materials may include Zirconium dioxide, Tantalum Pentoxide, Niobium Pentoxide, Lithium Niobate, Silicon Nitride, Silicon Carbide, Calcium Fluoride, and polymer coating, with thicknesses ranging from a few nanometers to a few microns.

Figure 5:
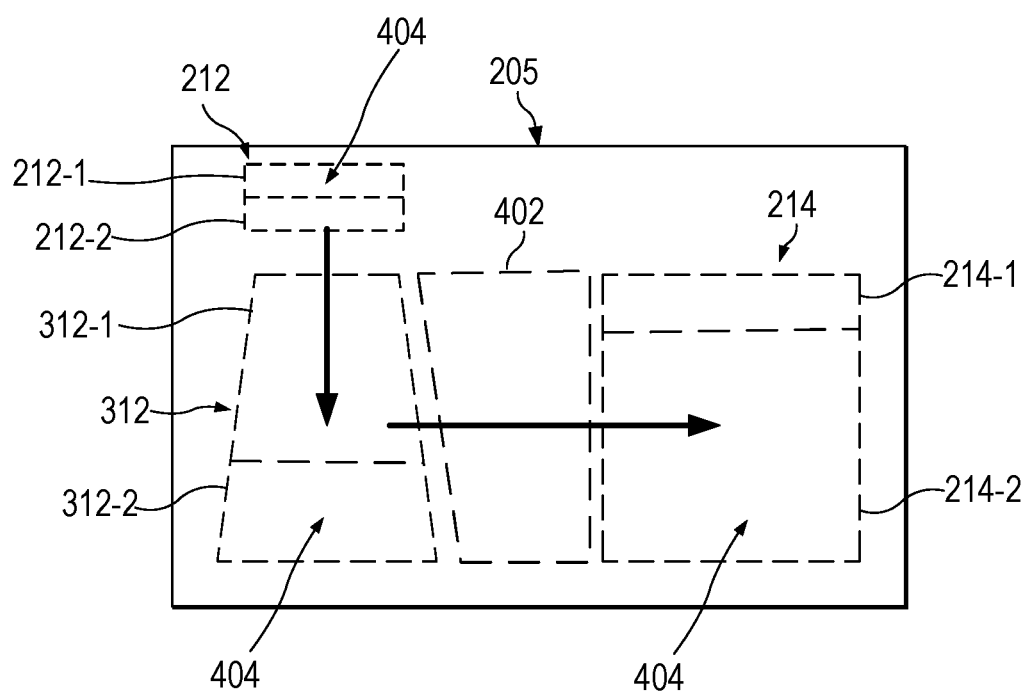
FIG. 5 shows an example of selective application of an anti-reflective coating to portions of the waveguide of the projection system of FIG. 2 in accordance with some embodiments.

In some embodiments, anti-reflective coating 404 is applied to various combinations of incoupler 212, exit pupil expander 312, region 402, and outcoupler 214 in order to balance cosmetic design constraints, as well as image projection quality and efficiency. For example, in some scenarios, it is beneficial to apply an anti-reflective coating on the exit pupil expander to reduce the diffraction efficiency of this grating, compared to the output coupler, and thus balance the display brightness better across the eyebox. In other scenarios, it is beneficial to apply a coating on some parts of the pupil expander or output coupler to expand the range of diffraction efficiencies available to modulate the grating efficiencies. In other embodiments, such as shown in FIG. 5, anti-reflective coating 404 is applied to a segment of each of the regions that include an optical grating (i.e., incoupler 212, exit pupil expander 312, and outcoupler 214). That is, incoupler 212 contains a first incoupler segment 212-1 and a second incoupler segment 212-2, wherein only one of the two incoupler segments is overlayed with anti-reflective coating 404 or, alternatively, one of the incoupler segments 212-1, 212-2 is overlayed with anti-reflective coating 404 and the other incoupler segment is overlayed with a second anti-reflective coating having different properties and/or materials from anti-reflective coating 404. For example, an anti-reflective coating could be applied to parts of the exit pupil expander grating that are closer to the input coupler grating, in order to reduce their diffraction efficiency, and thus balance the distribution of light across the eyebox better. Similarly, applying no coatings on the input coupler grating will result in higher coupling efficiency.

Likewise, in some embodiments, exit pupil expander 312 includes a first exit pupil expander segment 312-1 and a second exit pupil expander segment 312-2, wherein only one of the two exit pupil expander segments 312-1, 312-2 is overlayed with anti-reflective coating 404 or, alternatively, one of the two exit pupil expanders 312-1, 312-2 is overlayed with anti-reflective coating 404 and the other exit pupil expander segment is overlayed with a second anti-reflective coating having different properties and/or materials from anti-reflective coating 404. In some embodiments, outcoupler 214 includes a first outcoupler segment 214-1 and a second outcoupler segment 214-2, wherein only one of the two outcoupler segments 214-1, 214-2 is overlayed with anti-reflective coating 404 or, alternatively, one of the two outcoupler segments 214-1, 214-2 is overlayed with anti-reflective coating 404 and the other outcoupler segment is overlayed with a second anti-reflective coating having different properties and/or materials from anti-reflective coating 404.

It should be noted that while the incoupler segments 212-1, 212-2, exit pupil expander segments 312-1, 312-2, and outcoupler segments 214-1, 214-2 described herein and shown in FIG. 5 are illustrated as occupying a particular area of the respective features, these segments may be of varying shapes, sizes, and locations with respect to the respective features.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A waveguide comprising:
   a first major planar surface and a second major planar surface parallel to the first major planar surface;
   an incoupler configured to direct light into the waveguide;
   an outcoupler configured to direct light out of the waveguide, wherein the incoupler and outcoupler comprise optical gratings, at least one of the incoupler or the outcoupler located at the first major planar surface of the waveguide; and
   an anti-reflective coating overlaying a region of the first major planar surface of the waveguide, the region excluding areas of the first planar major surface with the at least one of the incoupler or the outcoupler.

2. The waveguide of claim 1, further comprising:
the region disposed in an optical path between the incoupler and outcoupler, wherein the region contains no optical gratings.

3. The waveguide of claim 2, wherein the region is configured to transmit light via total internal reflection (TIR).

4. The waveguide of claim 1, wherein the anti-reflective coating comprises alternating layers of low refractive index dielectric material and high refractive index dielectric material.

5. The waveguide of claim 1, wherein the anti-reflective coating comprises silicon dioxide and titanium dioxide.

6. The waveguide of claim 1, further comprising:
an exit pupil expander, disposed in an optical path between the incoupler and outcoupler, the exit pupil expander comprising an optical grating; and
wherein an area of the first major planar surface associated with the exit pupil expander is not overlayed with the anti-reflective coating.

7. The waveguide of claim 1, the waveguide configured to transmit light via total internal reflection (TIR) between the first major planar surface and the second major planar surface.

8. A head-mounted display (HMD) device, comprising:
a projector configured to project light;
a waveguide, comprising a first major planar surface and a second major planar surface, configured to receive light projected from the projector via an incoupler;
an outcoupler configured to direct light out of the waveguide, wherein the incoupler and outcoupler comprise optical gratings, at least one of the incoupler or the outcoupler located at the first major planar surface of the waveguide; and
an anti-reflective coating overlaying a region of the first major planar surface of the waveguide, the region excluding an area of the first major planar surface with the at least one of the incoupler or outcoupler.

9. The HMD of claim 8, further comprising:
the region disposed in an optical path between the incoupler and outcoupler, wherein the region contains no optical gratings.

10. The HMD of claim 9, wherein the region is configured to transmit light via total internal reflection (TIR).

11. The HMD of claim 8, wherein the anti-reflective coating comprises alternating layers of low refractive index dielectric material and high refractive index dielectric material.

12. The HMD of claim 8, wherein the anti-reflective coating comprises silicon dioxide and titanium dioxide.

13. The HMD of claim 8, further comprising:
an exit pupil expander, disposed in an optical path between the incoupler and outcoupler, the exit pupil expander comprising an optical grating; and
wherein an area of the first major planar surface associated with the exit pupil expander is not overlayed with the anti-reflective coating.

14. The HMD of claim 8, one of the first major planar surface and the second major planar surface facing a worldside of the HMD, and the other one of the first major planar surface and the second major planar surface facing a userside of the HMD.

15. A method comprising:
coating a first major planar surface of a waveguide, the first major planar surface comprising an optical grating, with an anti-reflective coating; and
excluding, from the coating with the anti-reflective coating, areas on the first major planar surface of the waveguide containing the optical grating.

16. The method of claim 15, wherein the areas on the first major planar surface of the waveguide containing the optical grating include at least one of an incoupler, an outcoupler, or an exit pupil expander.

17. The method of claim 15, wherein the anti-reflective coating comprises alternating layers of low refractive index dielectric material and high refractive index dielectric material.

18. The method of claim 15, wherein the anti-reflective coating comprises silicon dioxide and titanium dioxide.

19. The method of claim 15, wherein the waveguide comprises a second major planar surface, one of the first major planar surface and the second major planar surface to be world-facing in a head-mounted display (HMD), and the other one of the first major planar surface and the second major planar surface to be eye-facing in the HMD.

\* \* \* \* \*